US 12,454,195 B2

(12) United States Patent
Saita

(10) Patent No.: US 12,454,195 B2
(45) Date of Patent: Oct. 28, 2025

(54) CONTROL APPARATUS, MOBILE OBJECT, METHOD, AND COMPUTER-READABLE STORAGE MEDIUM

(71) Applicant: HONDA MOTOR CO., LTD., Tokyo (JP)

(72) Inventor: Akira Saita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 262 days.

(21) Appl. No.: 18/161,092

(22) Filed: Jan. 30, 2023

(65) Prior Publication Data

US 2023/0311703 A1 Oct. 5, 2023

(30) Foreign Application Priority Data

Mar. 30, 2022 (JP) ................................. 2022-056761

(51) Int. Cl.
  *B60L 58/12* (2019.01)
  *B60L 3/00* (2019.01)
  *B60L 55/00* (2019.01)

(52) U.S. Cl.
  CPC ............. *B60L 58/12* (2019.02); *B60L 3/0046* (2013.01); *B60L 55/00* (2019.02);
  (Continued)

(58) Field of Classification Search
  CPC ........ B60L 58/12; B60L 55/00; B60L 3/0046; B60L 2240/54
  See application file for complete search history.

(56) References Cited

U.S. PATENT DOCUMENTS

2015/0137752 A1 5/2015 Satoru
2017/0190258 A1* 7/2017 Hashimoto ............. B60L 58/15
(Continued)

FOREIGN PATENT DOCUMENTS

JP 2011172315 A 9/2011
JP 2015109791 A 6/2015
(Continued)

OTHER PUBLICATIONS

Office Action issued for counterpart Japanese Application No. 2022-056761, transmitted from the Japanese Patent Office on Jan. 9, 2024 (drafted on Jan. 5, 2024).

*Primary Examiner* — Helal A Algahaim
*Assistant Examiner* — Patrick M Brady

(57) ABSTRACT

A control apparatus includes: a movement information acquisition unit configured to acquire information indicating a usage period of a mobile object and a movement distance or a destination of the object to be ensured within the usage period; and a restriction unit configured to restrict a power amount from a battery included in the object to an outside of the object so as to ensure that the object can move the movement distance or move to the destination within the usage period. A method includes: acquiring information indicating a usage period of a mobile object and a movement distance or a destination of the object to be ensured within the usage period; and restricting a power amount from a battery included in the object to an outside of the object so as to ensure that the object moves the movement distance or moves to the destination within the usage period.

18 Claims, 12 Drawing Sheets

(52) U.S. Cl.
CPC ....... *B60L 2240/54* (2013.01); *B60L 2240/62* (2013.01); *B60L 2260/50* (2013.01)

(56) References Cited

U.S. PATENT DOCUMENTS

| | | | |
|---|---|---|---|
| 2017/0205787 A1* | 7/2017 | Lee | H02J 3/00 |
| 2019/0061552 A1 | 2/2019 | Amari | |
| 2020/0290473 A1 | 9/2020 | Ogawa | |
| 2020/0384887 A1* | 12/2020 | Yokoyama | B60L 58/10 |
| 2021/0122260 A1 | 4/2021 | Kazuno | |
| 2021/0170903 A1 | 6/2021 | Tsuchiya | |
| 2021/0331599 A1 | 10/2021 | Hishida | |
| 2021/0339650 A1* | 11/2021 | Hashimoto | B60L 50/60 |
| 2022/0085613 A1 | 3/2022 | Ogawa | |
| 2023/0168310 A1* | 6/2023 | Axelsson | G01R 31/389 |
| | | | 429/50 |

FOREIGN PATENT DOCUMENTS

| | | |
|---|---|---|
| JP | 6596472 B2 | 10/2019 |
| JP | 2020150767 A | 9/2020 |
| JP | 2021069215 A | 4/2021 |
| JP | 6892895 B2 | 6/2021 |
| JP | 2021093802 A | 6/2021 |
| JP | 2021100322 A | 7/2021 |
| JP | 2022048786 A | 3/2022 |
| WO | 2020148850 A1 | 7/2020 |

* cited by examiner

CONTROL APPARATUS, MOBILE OBJECT, METHOD, AND COMPUTER-READABLE STORAGE MEDIUM

The contents of the following Japanese patent application(s) are incorporated herein by reference:
NO. 2022-056761 filed on Mar. 30, 2022.

BACKGROUND

1. Technical Field

The present invention relates to a control apparatus, a mobile object, a method, and a computer-readable storage medium.

2. Related Art

In recent years, in order to be able to secure access to affordable, reliable, sustainable, and advanced energy for more people, research and development related to a secondary battery that contributes to energy efficiency has been carried out. Patent Documents 1 to 4 describe techniques related to charging and discharging of a secondary battery included in a vehicle.

PRIOR ART DOCUMENT

Patent Document 1: Japanese Patent Application Publication No. 2011-172315.
Patent Document 2: Japanese Patent No. 6892895.
Patent Document 3: Japanese Patent No. 6596472.
Patent Document 4: Japanese Patent Application Publication No. 2021-93802.

DESCRIPTION OF EXEMPLARY EMBODIMENTS

Hereinafter, the present invention will be described through embodiments of the invention, but the following embodiments do not limit the claimed invention. In addition, not all combinations of features described in the embodiments are necessary to the solution of the invention.

Figure 1:
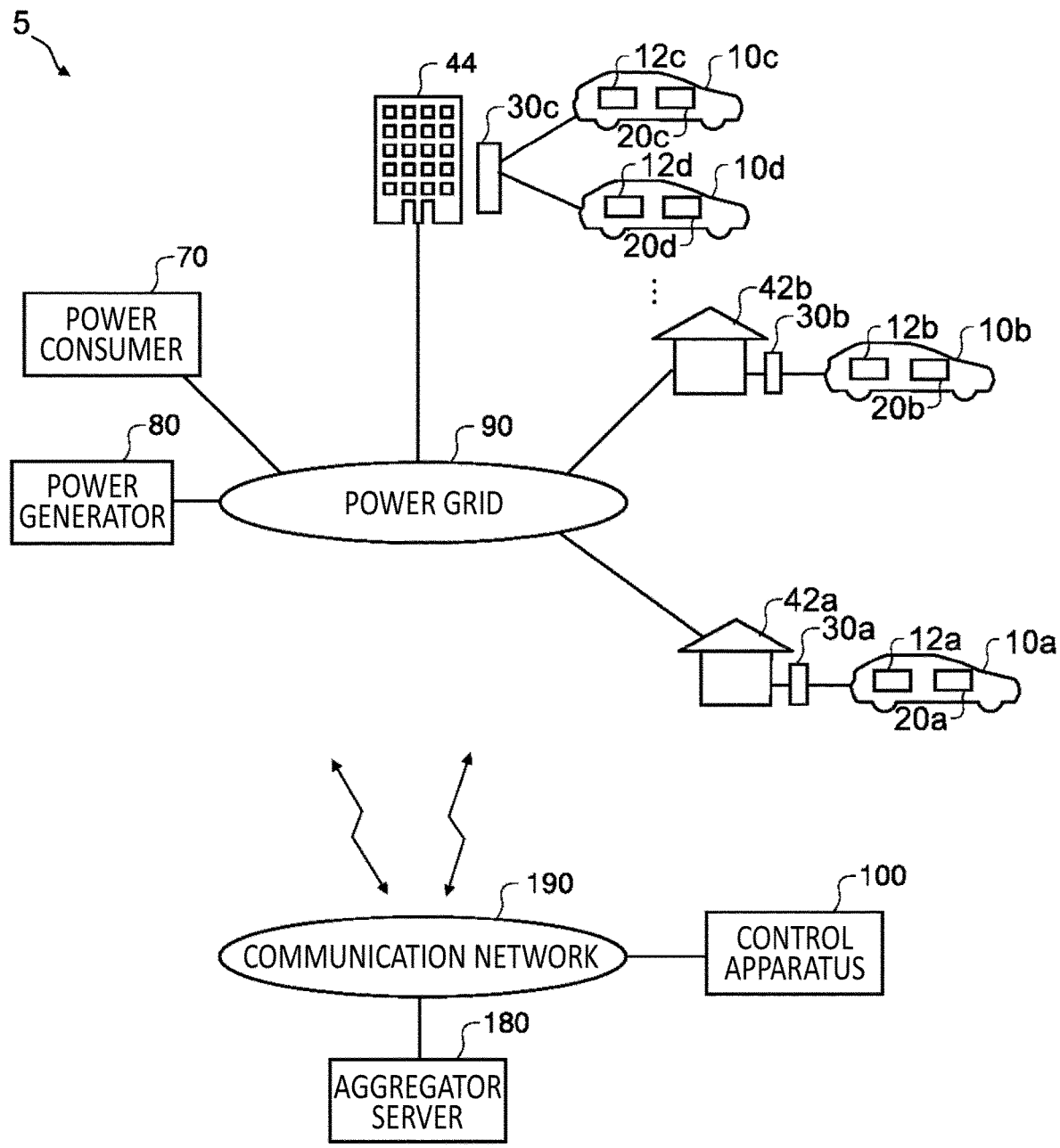
FIG. 1 conceptually shows a utilization form of a system 5 in one embodiment.

FIG. 1 conceptually shows a utilization form of a system 5 in one embodiment. The system 5 includes: a charging and discharging facility 30a, a charging and discharging facility 30b, and a charging and discharging facility 30c; a power generator 80; a control apparatus 100; an aggregator server 180; and a vehicle 10a, a vehicle 10b, a vehicle 10c, and a vehicle 10d.

The vehicle 10a, the vehicle 10b, the vehicle 10c, and the vehicle 10d respectively include a battery 12a, a battery 12b, a battery 12c, and a battery 12d. The vehicle 10a, the vehicle 10b, the vehicle 10c, and the vehicle 10d respectively include a control apparatus 20a, a control apparatus 20b, a control apparatus 20c, and a control apparatus 20d. In this embodiment, the vehicle 10a, the vehicle 10b, the vehicle 10c, and the vehicle 10d may be collectively referred to as "vehicle(s) 10". The battery 12a, the battery 12b, the battery 12c, and the battery 12d may be collectively referred to as "battery (batteries) 12". The control apparatus 20a, the control apparatus 20b, the control apparatus 20c, and the control apparatus 20d may be collectively referred to as "control apparatus 20". The charging and discharging facility 30a, the charging and discharging facility 30b, and the charging and discharging facility 30c may be collectively referred to as "charging and discharging facility 30".

The control apparatus 100 is connected to the aggregator server 180 through a communication network 190. The control apparatus 100 can communicate with the charging and discharging facility 30 through the communication network 190. The control apparatus 100 controls the charging and discharging facility 30 through the communication network 190. The control apparatus 100 communicates with the control apparatus 20 of the vehicle 10 through the communication network 190 and acquires various types of information of the vehicle 10 including a travel history of the vehicle 10 as well as an SOC and an SOH of the battery 12.

The charging and discharging facility 30, a power consumer 70, and the power generator 80 are connected to a power grid 90. The power generator 80 includes, for example, a power plant operated by a power company. Power generated by the power generator 80 can be supplied to the charging and discharging facility 30 and the power consumer 70 through the power grid 90. The power grid 90 is, for example, a power system.

Each charging and discharging facility 30 charges and discharges the battery 12 mounted on the vehicle 10 connected to each. The vehicle 10 is, for example, an electric car. The battery 12 supplies power for travelling of the vehicle 10. The vehicle 10 may be a privately owned vehicle, a vehicle used by a business operator for business, a shared car, or the like.

The charging and discharging facility 30a is provided for the dwelling unit 42a, and charges and discharges the battery 12a of the vehicle 10a connected to the charging and discharging facility 30a. When the battery 12a is discharged, power provided from the battery 12a may be consumed by a power load in the dwelling unit 42a or may be provided to the power grid 90 through a power line arranged in the dwelling unit 42a. The charging and discharging facility 30b is provided for the dwelling unit 42b, and charges and discharges the battery 12b of the vehicle 10b connected to the charging and discharging facility 30b. When the battery 12b is discharged, power provided from the battery 12b is consumed by a power load in the dwelling unit 42b or is provided to the power grid 90 through a power line arranged in the dwelling unit 42b. The charging and discharging facility 30c is provided for an establishment 44, and charges and discharges the battery 12c and the battery 12d respectively mounted on the vehicle 10c and the vehicle 10d connected to the charging and discharging facility 30c. When the battery 12c and the battery 12d are discharged, power provided from the battery 12c and the battery 12d may be consumed by a power load in the establishment 44 or may be provided to the power grid 90 through a power line arranged in the establishment 44.

Each charging and discharging facility 30 can charge the battery 12 with power received from the power grid 90. The charging and discharging facility 30 can transmit power to the power grid 90 by discharging the battery 12.

When power is transmitted and received between the power grid 90 and the battery 12, the charging and discharging facility 30 and the control apparatus 20 of the vehicle 10 charge and discharge the battery 12 under control of the control apparatus 100. For example, when there is a power shortage in the power grid 90, the control apparatus 100 can cause the power to be transmitted from the battery 12 to the power grid 90 by instructing the charging and discharging facility 30 and the control apparatus 20 to discharge the battery 12. When there is a power surplus in the power grid 90, the control apparatus 100 can cause the power surplus of the power grid 90 to be reduced by instructing the charging and discharging facility 30 and the control apparatus 20 to charge the battery. Thus, the control apparatus 100 can provide a primary adjusting power, a secondary adjusting power, a tertiary adjusting power, and the like in the power grid 90 in cooperation with the charging and discharging facility 30 and the control apparatus 20. This allows the control apparatus 100 to aggregate a plurality of batteries 12 mounted on a plurality of vehicles 10 to provide a power resource for the power grid 90.

The aggregator server 180 is, for example, used by a power aggregator. The aggregator server 180 makes a power trade in a power market. The control apparatus 100 provides a required amount of power to the power grid 90 in communication with the aggregator server 180. For example, the control apparatus 100 controls the charging and discharging facility 30 and the control apparatus 20 to charge and discharge the battery 12 on demand from the aggregator server 180 and provides an amount of power to meet the demand.

Figure 2:
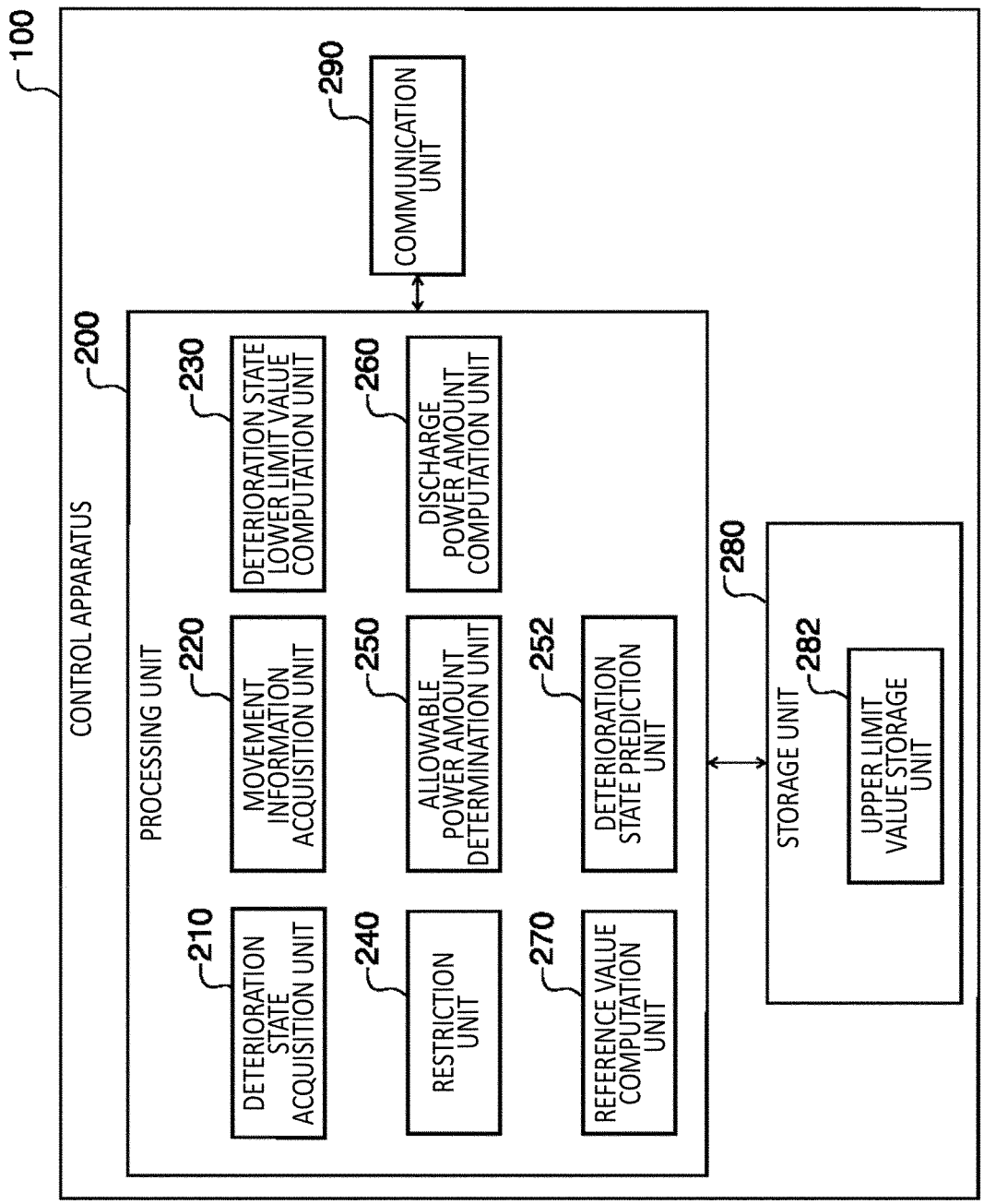
FIG. 2 shows one example of a system configuration of a control apparatus 100.

FIG. 2 shows one example of a system configuration of the control apparatus 100. The control apparatus 100 includes a processing unit 200, a storage unit 280, and a communication unit 290.

The processing unit 200 controls the communication unit 290. The communication unit 290 is responsible for communication between the aggregator server 180 and the vehicle 10. The processing unit 200 is realized by an arithmetic processing apparatus including a processor. The storage unit 280 is realized including a non-volatile storage medium. The processing unit 200 performs processing by using information stored in the storage unit 280. The processing unit 200 may be realized by a microcomputer provided with a CPU, a ROM, a RAM, an I/O, a bus, and the like. The control apparatus 100 may be realized by a computer.

In this embodiment, the control apparatus 100 shall be realized by a single computer. However, in another embodiment, the control apparatus 100 may be realized by a plurality of computers. At least some functions of the control apparatus 100 may be realized by one or more servers such as a cloud server.

The processing unit 200 includes a deterioration state acquisition unit 210, a movement information acquisition unit 220, a deterioration state lower limit value computation unit 230, a restriction unit 240, an allowable power amount determination unit 250, a discharge power amount computation unit 260, a reference value computation unit 270, and a deterioration state prediction unit 252. The storage unit 280 includes an upper limit value storage unit 282.

The movement information acquisition unit 220 acquires information indicating a usage period of the vehicle 10 and a movement distance or a destination of the vehicle 10 to be ensured within the usage period. The restriction unit 240 restricts a power amount from the battery 12 included in the vehicle 10 to an outside of the vehicle 10 such that it is ensured that the vehicle 10 can move the movement distance or move to the destination within the usage period. The outside of the vehicle 10 is, for example, the power grid 90.

The deterioration state lower limit value computation unit 230 computes a lower limit value of a deterioration state of the battery 12 that can ensure the movement of the movement distance or the movement to the destination at an end of the usage period. The restriction unit 240 restricts the power amount from the battery 12 to the outside of the vehicle 10 such that the deterioration state of the battery 12 is not below the lower limit value at the end of the usage period.

The deterioration state acquisition unit 210 acquires the deterioration state of the battery 12. Based on a current deterioration state of the battery 12, the allowable power amount determination unit 250 determines an allowable power amount that can be allowed to be released from the battery 12 to the outside of the vehicle 10 during a period from a present time to the end of the usage period. The restriction unit 240 restricts the power amount from the battery 12 to the outside of the vehicle 10 such that a total power amount from the battery 12 to the outside of the vehicle 10 during the period from a present time to the end of the usage period is equal to or less than the allowable power amount.

The upper limit value storage unit 282 stores an upper limit value of a total discharge power amount that is allowed to be discharged from the battery 12 during a predetermined period from a start of use of the vehicle 10. The discharge power amount computation unit 260 computes a discharge power amount that has been discharged from the battery 12 during a period from the start of use to a present time. The allowable power amount determination unit 250 determines the allowable power amount based on the power amount obtained by correcting, based on the current deterioration state of the battery 12, a difference value obtained by subtracting, from the upper limit value of the total discharge power amount, the discharge power amount computed by the discharge power amount computation unit 260.

The reference value computation unit 270 computes a reference value of the deterioration state of the battery 12 during the usage period. The allowable power amount determination unit 250 determines the allowable power amount based on a result of comparing the deterioration state of the battery 12 and the reference value.

The deterioration state prediction unit 252 computes a prediction value of the deterioration state of the battery 12 in a future based on a usage history of the vehicle 10. The allowable power amount determination unit 250 determines the allowable power amount based on a result of comparing the prediction value of the deterioration state at the end of the usage period and the lower limit value of the deterioration state.

When the prediction value of the deterioration state is greater than the lower limit value of the deterioration state, the allowable power amount determination unit 250 increases the allowable power amount. When the prediction value of the deterioration state is smaller than the lower limit value of the deterioration state, the allowable power amount determination unit 250 decreases the allowable power amount.

Figure 3:
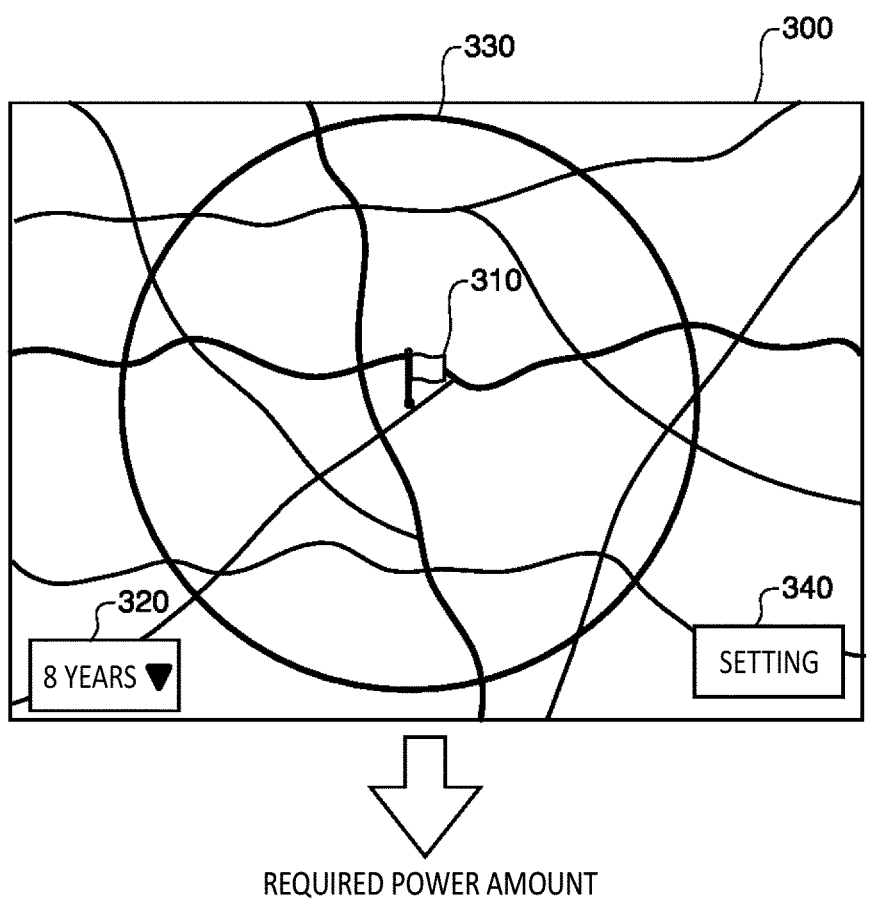
FIG. 3 shows a screen 300 on which user setting information indicating a usage period of a vehicle 10 and a travelable distance of the vehicle 10 is set.

FIG. 3 shows a screen 300 on which user setting information indicating the usage period of the vehicle 10 and a travelable distance of the vehicle 10 is set. The user setting information is inputted to the control apparatus 20 of the vehicle 10 through information equipment such as a navigation device included in the vehicle 10 and is transmitted from the control apparatus 20 to the control apparatus 100. In another form, the user setting information may be inputted to a mobile terminal of a user of the vehicle 10 and may be transmitted to the control apparatus 100. The user setting information may be set in the control apparatus 100 through a personal computer.

As shown in FIG. 3, the screen 300 displays an image of a map including a location 310 of a home of the user of the vehicle 10. The screen 300 includes an object 320 for the user to input the usage period of the vehicle 10. The screen 300 includes an object 330 for setting a range where the vehicle 10 may travel within the usage period.

The object 330 is a circular object centered at a predetermined location 310. The user can increase or decrease a size of the object 330 by key operation, touch operation, or the like. The user may change the size of the object 330 so that the object 330 includes all destinations for which there is a possibility of moving by means of the vehicle 10 within a period set in the object 320. As a result, the user specifies a range where it should be ensured to travel by the vehicle 10 without charging the vehicle 10 at a charging station.

The screen 300 includes an object 340 for determining the usage period of the vehicle 10 and the range where travelling by the vehicle 10 should be ensured. When the user operates the object 340, the setting information set through the screen 300 is transmitted to the control apparatus 100. The setting information includes, for example, information indicating coordinates of the location 310, a radius of the object 330, and the usage period set in the object 320.

When the control apparatus 100 receives the setting information from the control apparatus 20, based on the received setting information, the movement information acquisition unit 220 acquires the usage period of the vehicle 10 and computes information indicating a travel distance for which it should be ensured that the vehicle 10 can travel within that usage period. For example, the movement information acquisition unit 220 selects points to which it is possible to move by the vehicle 10 from a plurality of points that overlap with an outer shape of the object 330, and computes a round-trip distance to the location 310 for each of the selected points. Based on electricity consumption information of the vehicle 10, the movement information acquisition unit 220 computes, as a required power amount, the power amount required to travel the longest distance among the round-trip distances between the respective points and the location 310. Based on the electricity consumption information for each route, the movement information acquisition unit 220 may compute a maximum power amount required to make a round trip between each of the points and the location 310.

Note that, on the screen 300, information indicating a point of the destination for which moving by means of the vehicle 10 is ensured may be set as the setting information. In addition, on the screen 300, information indicating the distance itself for which moving by the vehicle 10 should be ensured may be set as the setting information.

Figure 4:
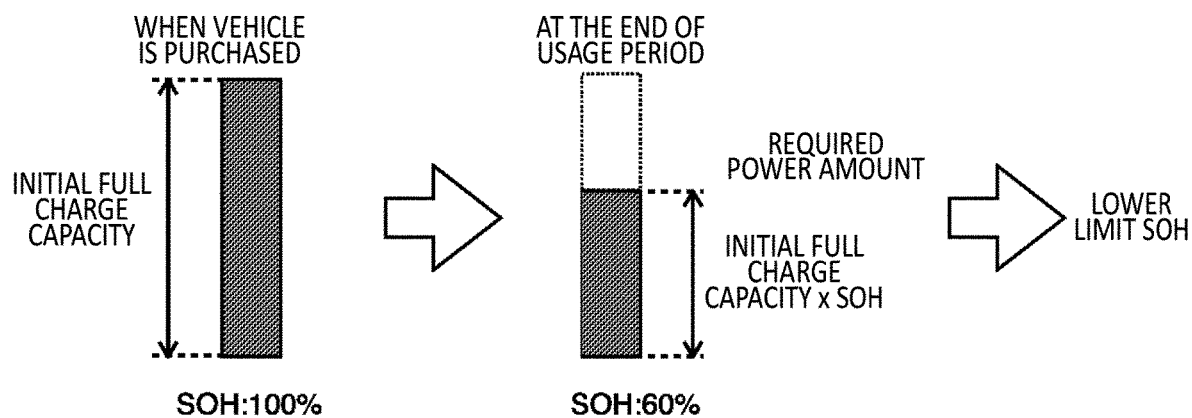
FIG. 4 shows a decrease in an SOH (State of Health) of a battery 12 caused by the use of the vehicle 10.

FIG. 4 shows a decrease in an SOH (State of Health) of the battery 12 caused by the use of the vehicle 10. The SOH is one example of the deterioration state of the battery 12. The SOH is also called soundness. The SOH may be represented by a capacity retention rate or a rate of increase in internal resistance. Assume that, in this embodiment, the SOH is represented by, for example, the capacity retention rate and indicates lowness of the deterioration of the battery 12.

Assume that an initial full charge capacity of the battery 12 for a case where the user purchases the vehicle 10 is in a state of SOH: 100%. FIG. 4 shows a state where the SOH of the battery 12 has decreased to 60% after an 8-year usage period has elapsed since a start of the use of the vehicle 10. In this case, a full charge capacity of the battery 12 is 60% of the initial full charge capacity. Therefore, in order to ensure that the vehicle 10 can move within the range set by the user when the 8-year usage period has elapsed, when the 8-year usage period has elapsed, the initial full charge capacity x a value of the SOH needs to be equal to or greater than the required power amount computed based on the setting information. As such, the deterioration state lower limit value computation unit 230 computes the SOH that satisfies the initial full charge capacity x the SOH the required power amount, as a lower limit SOH of the battery 12 at a time when the 8-year usage period has elapsed.

Figure 5:
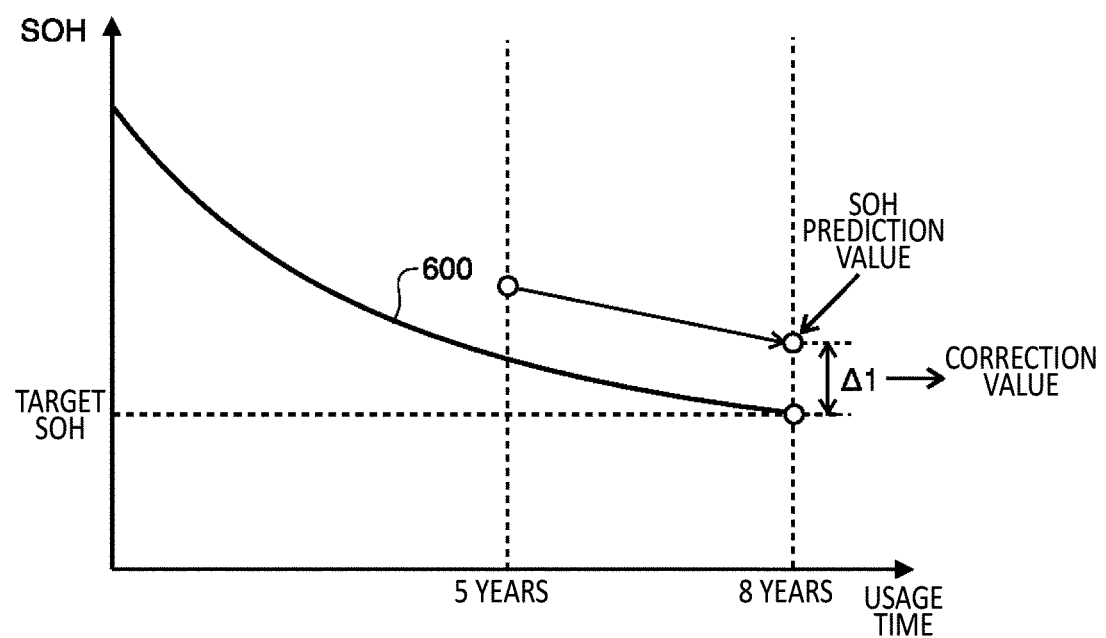
FIG. 5 is a graph showing one example of transition of a deterioration state of the battery 12.

FIG. 5 is a graph showing one example of transition of the deterioration state of the battery 12. The horizontal axis of the graph in FIG. 5 represents a usage time of the vehicle 10, and the vertical axis represents the SOH.

A reference line 600 indicates transition of a reference value of the SOH that changes relative to elapse of the usage time of the vehicle 10. The reference line 600 is set such that the SOH of the battery 12 will be a target SOH when the 8-year usage period ends. The target SOH may be set to a value equal to or greater than the lower limit SOH computed by the deterioration state lower limit value computation unit 230. Reference deterioration information indicating the reference line 600 is stored in the storage unit 280. The reference deterioration information may be a conversion table that converts the usage time to the value of the SOH.

The deterioration state prediction unit 252 predicts the SOH at the end of usage period from the SOH of the battery 12 at a time point when 5 years have elapsed. For example, the deterioration state prediction unit 252 may compute an SOH prediction value in the future by using future prediction information of the SOH generated based on history information of the SOH collected from many vehicles 10.

In FIG. 5, the SOH prediction value is greater than the target SOH by Δ1. Therefore, it is predicted that the required power amount can be provided at the end of the 8-year usage period even if the deterioration of the battery 12 progresses to some extent during a period up to the end of the 8-year usage period. Therefore, the allowable power amount determination unit 250 computes a correction value for adjusting the power amount allowed to be received and transmitted by the battery 12 from and to the power grid 90 during the period up to the end of the 8-year usage period. The correction value will be described later.

Figure 6:
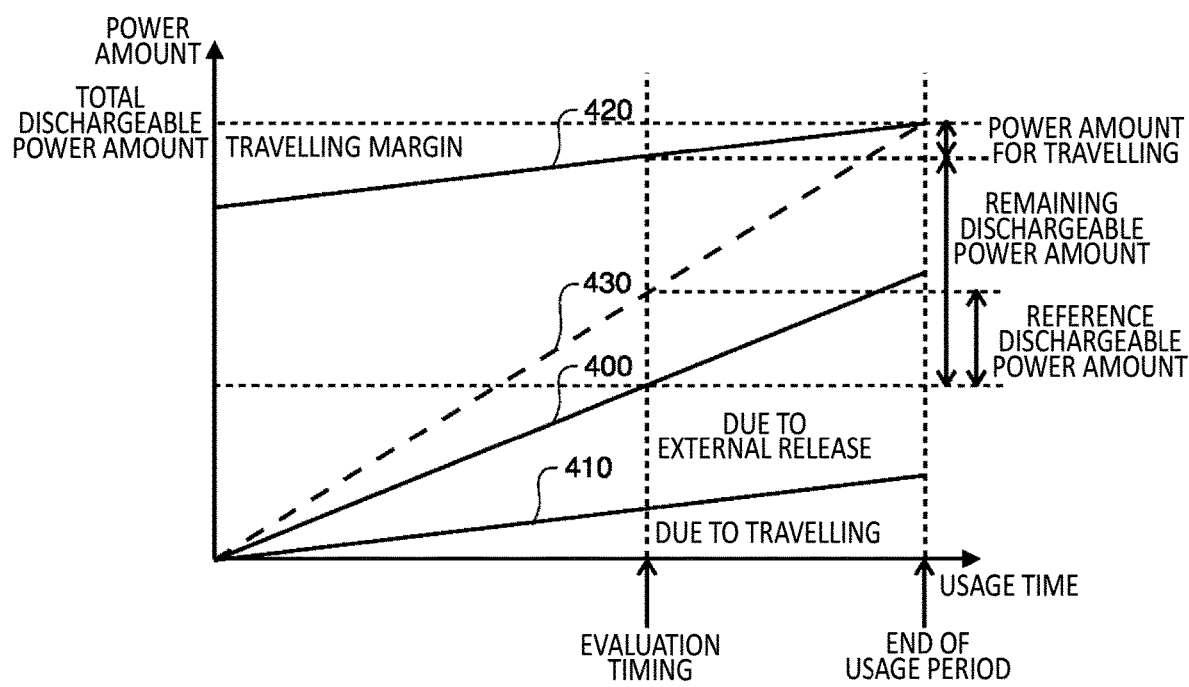
FIG. 6 describes parameters used to control power transmission and reception between a power grid 90 outside the vehicle 10 and the battery 12.

FIG. 6 describes parameters used to control power transmission and reception between the power grid 90 outside the vehicle 10 and the battery 12. The horizontal axis of the graph in FIG. 6 represents time, and the vertical axis represents the power amount. The origin point for the horizontal axis is, for example, when the vehicle 10 is purchased. The vertical axis represents the discharge power amount of the battery 12. In this embodiment, the control apparatus 100 controls charging and discharging of the battery 12 such that the power amount outputted by the battery 12 during a period from the start of use of the vehicle 10 to a specified end of usage period is equal to or less than a predetermined total dischargeable power amount. The total dischargeable power amount may be stored in the upper limit value storage unit 282.

In FIG. 6, a line 400 indicates a whole power amount outputted from the battery 12. A line 410 indicates the power amount outputted from the battery 12 due to the travelling of the vehicle 10 (due to travelling). A difference between the line 400 and the line 410 represents the power amount outputted from the battery 12 due to operation of the vehicle 10 other than travelling. In this embodiment, the difference between the line 400 and the line 410 represents the power amount released from the battery 12 to the power grid 90 outside the vehicle 10 (due to external release).

A line 420 represents the power amount to be secured for the travelling of the vehicle 10 in the future in the total dischargeable power amount that can be outputted by the battery 12 (travelling margin). A line 430 represents the power amount assumed when the battery 12 is averagely used such that power corresponding to the total dischargeable power amount is outputted from the battery 12 during a period from the start of use of the vehicle 10 to the end of usage period. That is, when the battery 12 is used along the line 430, an integral power amount outputted by the vehicle 10 during the period from the start of use of the vehicle 10 to the end of usage period will match the total dischargeable power amount. Reference information indicating the line 430 is stored in the storage unit 280.

The discharge power amount computation unit 260 computes the power amount of the battery 12 at the end of usage period due to the travelling of the vehicle 10. By extrapolating, until the end of usage period, a change in the power amount outputted from the battery 12 due to the travelling of the vehicle 10 during the period from the start of use of the vehicle 10 to a present time, the discharge power amount computation unit 260 may predict the power amount of the battery 12 at the end of usage period due to the travelling of the vehicle 10. A value computed by the discharge power amount computation unit 260 is a total value of the power amount outputted from the battery 12 during a period up to a present time due to the travelling of the vehicle 10 and the power amount for travelling in FIG. 6. The discharge power amount computation unit 260 further computes the power amount outputted from the battery 12 to the power grid 90 during the period up to a present time.

The allowable power amount determination unit 250 computes a remaining dischargeable power amount at current evaluation timing. The allowable power amount determination unit 250 computes the remaining dischargeable power amount by subtracting, from the total dischargeable power amount, the power amount computed by the discharge power amount computation unit 260. The remaining dischargeable power amount corresponds to an upper limit value that can be outputted from the battery 12 to the power grid 90 during the period up to the end of usage period of the vehicle 10.

The restriction unit 240 computes a reference dischargeable power amount at the current evaluation timing. The restriction unit 240 computes a reference power amount at a present time with reference to the reference information. The reference power amount at a present time is a value on the line 430 at a present time. The restriction unit 240 computes the reference dischargeable power amount by subtracting, from the reference power amount, the power amount outputted from the battery 12 during the period up to a present time due to the travelling of the vehicle 10 and the power amount outputted from the battery 12 to the power grid 90 during the period up to a present time. The restriction unit 240 restricts the charging and discharging of the battery 12 based on the remaining dischargeable power amount and the reference dischargeable power amount.

Figure 7:
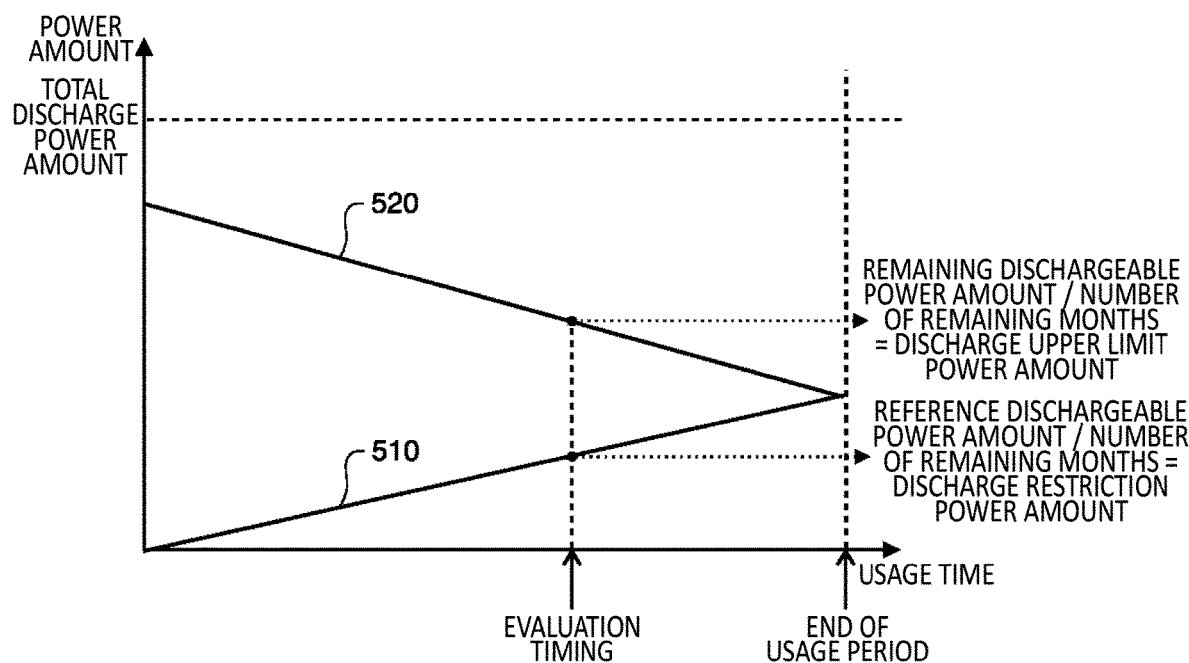
FIG. 7 conceptually shows changes in a remaining dischargeable power amount and a reference dischargeable power amount.

FIG. 7 conceptually shows changes in the remaining dischargeable power amount and the reference dischargeable power amount. In FIG. 7, a line 520 represents the remaining dischargeable power amount, and a line 510 represents the reference dischargeable power amount.

The restriction unit 240 computes a discharge upper limit power amount by dividing the remaining dischargeable power amount at a present time by the number of remaining months until the end of usage period. The discharge upper limit power amount corresponds to the power amount that can be allowed to be outputted from the battery 12 to the power grid 90 per month. If the power amount outputted from the battery 12 to the power grid 90 per month exceeds the discharge upper limit power amount, then it will exceed the total dischargeable power amount during the period up to the end of usage period. Therefore, the restriction unit 240 controls the charging and discharging of the battery 12 such that the power amount outputted from the battery 12 to the power grid 90 per month does not exceed the discharge upper limit power amount.

The restriction unit 240 computes a discharge restriction power amount by dividing the reference dischargeable power amount at a present time by the number of remaining months until the end of usage period. If the power amount outputted from the battery 12 to the power grid 90 per month exceeds the discharge restriction power amount, then it will exceed the line 430 in FIG. 6. Therefore, the restriction unit 240 controls the charging and discharging of the battery 12 such that the power amount outputted from the battery 12 to the power grid 90 per month does not exceed the discharge restriction power amount as much as possible.

Figure 8:
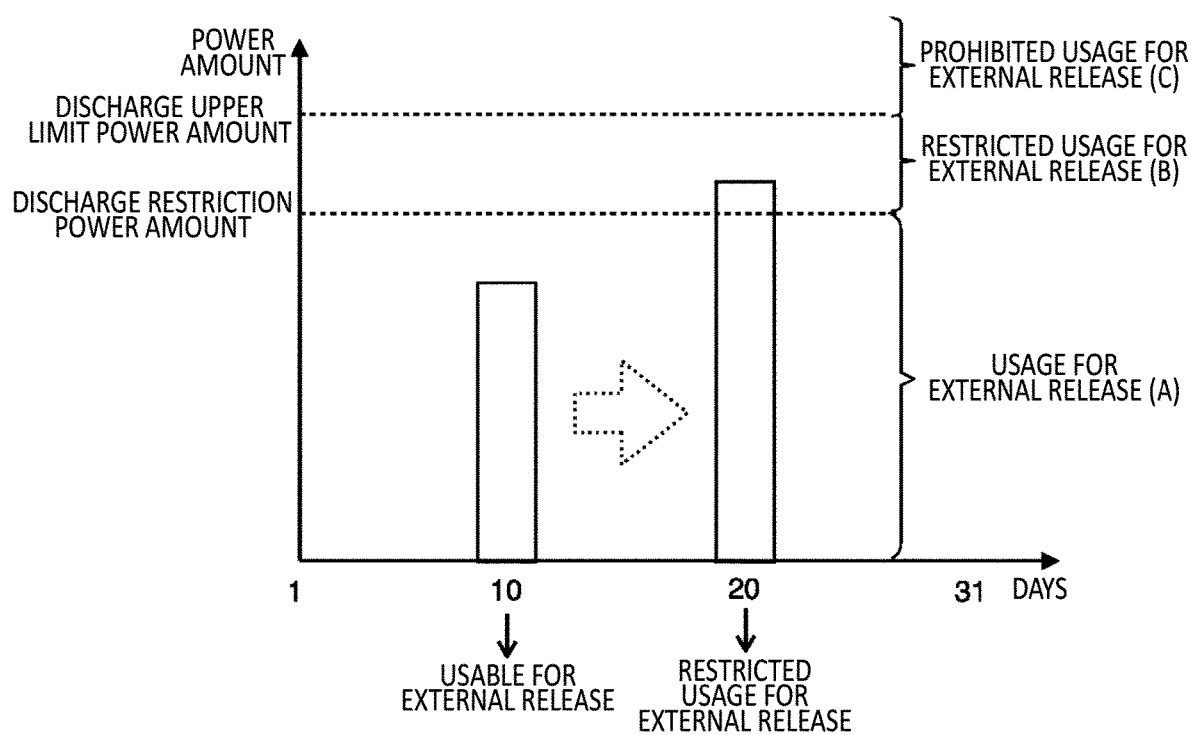
FIG. 8 describes control by a restriction unit 240.

FIG. 8 describes control by the restriction unit 240. The vertical axis in FIG. 8 represents the power amount outputted to the power grid 90 within a month. The horizontal axis represents the number of days in a month. The power amount outputted from the battery 12 to the power grid 90 during a period from the first day to the tenth day is less than the discharge restriction power amount. Therefore, the restriction unit 240 determines that the battery 12 can be used for power release to the power grid 90 (usage for external release).

On the other hand, the power amount outputted from the battery 12 to the power grid 90 during a period from the first day to the twentieth day exceeds the discharge restriction power amount. Therefore, the restriction unit 240 restricts the battery 12 from being used for power release to the power grid 90 (restricted usage for external release). For example, on a condition that the power amount required to be released to the power grid 90 cannot be released from another battery 12 determined as "usage for external release", the restriction unit 240 uses the battery 12 for power release to the power grid 90. If the power amount required to be released to the power grid 90 can be released from that another battery 12 determined as "usage for external release", the restriction unit 240 does not use the battery 12 for power release to the power grid 90.

Note that, if the power amount outputted from the battery 12 to the power grid 90 within a month exceeds the discharge upper limit power amount, the restriction unit 240 prohibits the battery 12 from being used for power release to the power grid 90 (prohibited usage for external release). In addition, in FIG. 8, A indicates that the battery 12 may be preferentially selected for power release to the power grid 90. B indicates that the battery 12 may be restrictively selected for power release to the power grid 90. C indicates that the battery 12 may not be selected for power release to the power grid 90. Thus, A, B, and C indicate a priority of using the battery 12 for power release to the power grid 90. Specifically, they indicate that A has a higher priority than B and indicate that B has a lower priority than C.

This allows the restriction unit 240 to control the battery 12 such that the power amount discharged by the battery 12 of the vehicle 10 to the power grid 90 reaches the total dischargeable power amount at the end of usage period of the vehicle 10.

Figure 9:
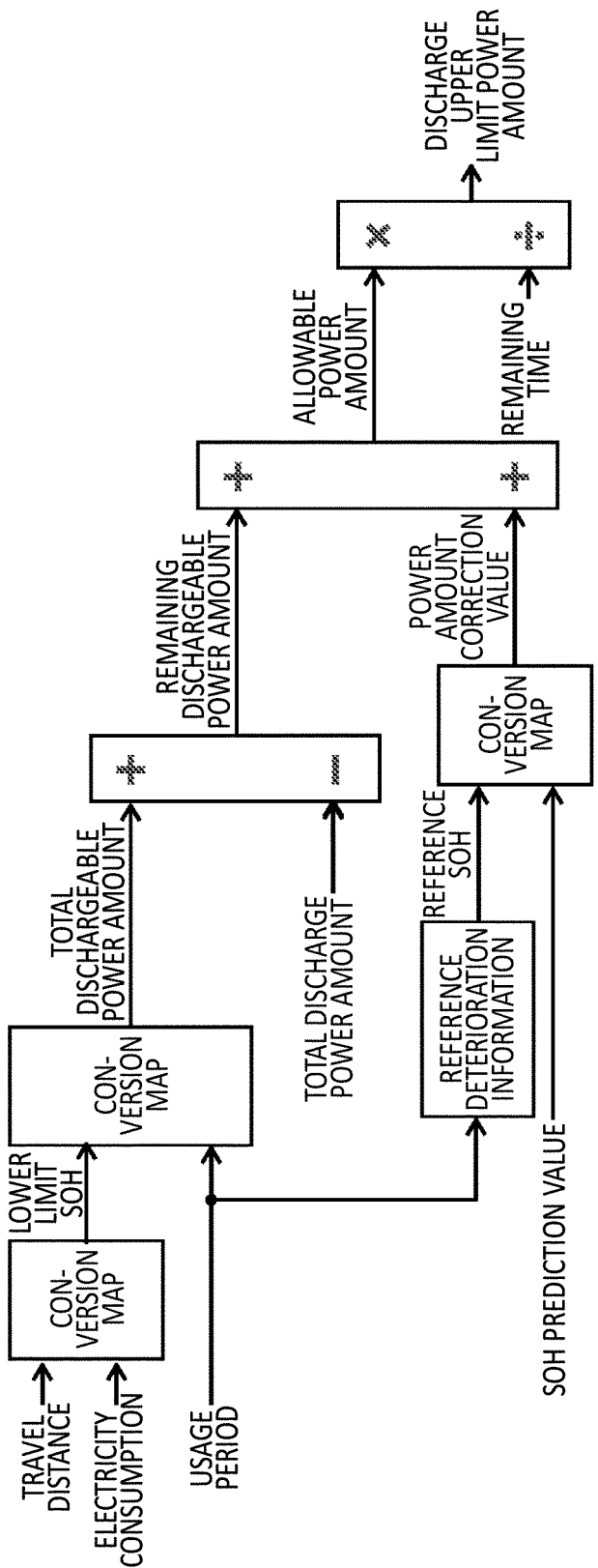
FIG. 9 shows a calculation content of the control apparatus 100 for a case where the remaining dischargeable power amount is corrected based on a target SOH at an end of usage period.

FIG. 9 shows a calculation content of the control apparatus 100 for a case where the remaining dischargeable power amount is corrected based on the target SOH at the end of usage period.

The deterioration state lower limit value computation unit 230 computes the lower limit SOH based on the travel distance computed by the movement information acquisition unit 220 and the electricity consumption information of the vehicle 10. The deterioration state lower limit value computation unit 230 may compute the lower limit SOH as described in connection to FIG. 4. The processing of computing the lower limit SOH by the deterioration state lower limit value computation unit 230 may be realized by a predetermined conversion map.

Next, the total dischargeable power amount is computed based on the lower limit SOH and the usage period of the vehicle 10. The processing of computing the total dischargeable power amount based on the lower limit SOH and the usage period of the vehicle 10 may be realized by the predetermined conversion map. The computed total dischargeable power amount is stored in the upper limit value storage unit 282.

Next, the remaining dischargeable power amount is computed by subtracting, from the total dischargeable power amount, the total discharge power amount computed by the discharge power amount computation unit 260. The total discharge power amount is, for example, a total value of the power amount released from the battery 12 when the vehicle 10 travels and the power amount released from the battery 12 to the power grid 90. The total discharge power amount may be computed in consideration of the travelling margin described above.

In addition, the reference value computation unit 270 computes a reference SOH based on the reference deterioration information and the usage time of the vehicle 10 at the end of usage period. The reference SOH is the value of the SOH on the reference line 600 at the end of usage period. Subsequently, the allowable power amount determination unit 250 computes the correction value by using the reference SOH and the SOH prediction value as well as a conversion map. The conversion map may be map information with the reference SOH and the SOH prediction value as an input and with the correction value as an output. The conversion map may output a greater correction value as a difference between the SOH prediction value and the reference SOH is greater. This correction value corresponds to the correction value computed based on 41 described in connection to FIG. 5.

Subsequently, the allowable power amount determination unit 250 corrects the remaining dischargeable power amount by adding the correction value to the remaining dischargeable power amount. Subsequently, the restriction unit 240 computes the discharge upper limit power amount per unit time by dividing the corrected remaining dischargeable power amount by a remaining time until the end of usage period. In the example described in connection to FIG. 8 or the like, the number of remaining months until the end of usage period is used as the remaining time until the end of usage period. In this case, the discharge upper limit power amount per month for a case where the battery 12 is used for power transmission and reception to and from the power grid 90 is computed.

Figure 10:
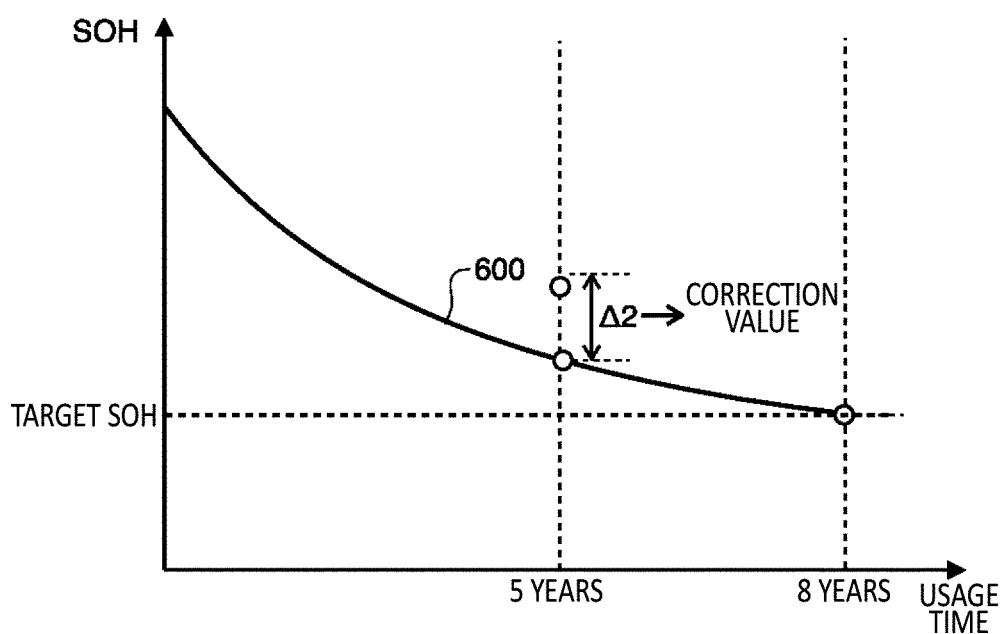
FIG. 10 shows that a correction value for the remaining dischargeable power amount is computed based on a current SOH.

FIG. 10 shows that the correction value for the remaining dischargeable power amount is computed based on a current SOH. Δ2 indicates the difference between the SOH of the battery 12 in the fifth year, and the reference SOH determined from the reference line 600 and the usage time (5 years). The allowable power amount determination unit 250 computes the correction value based on Δ2. The correction value will be described in connection to FIG. 11.

Figure 11:
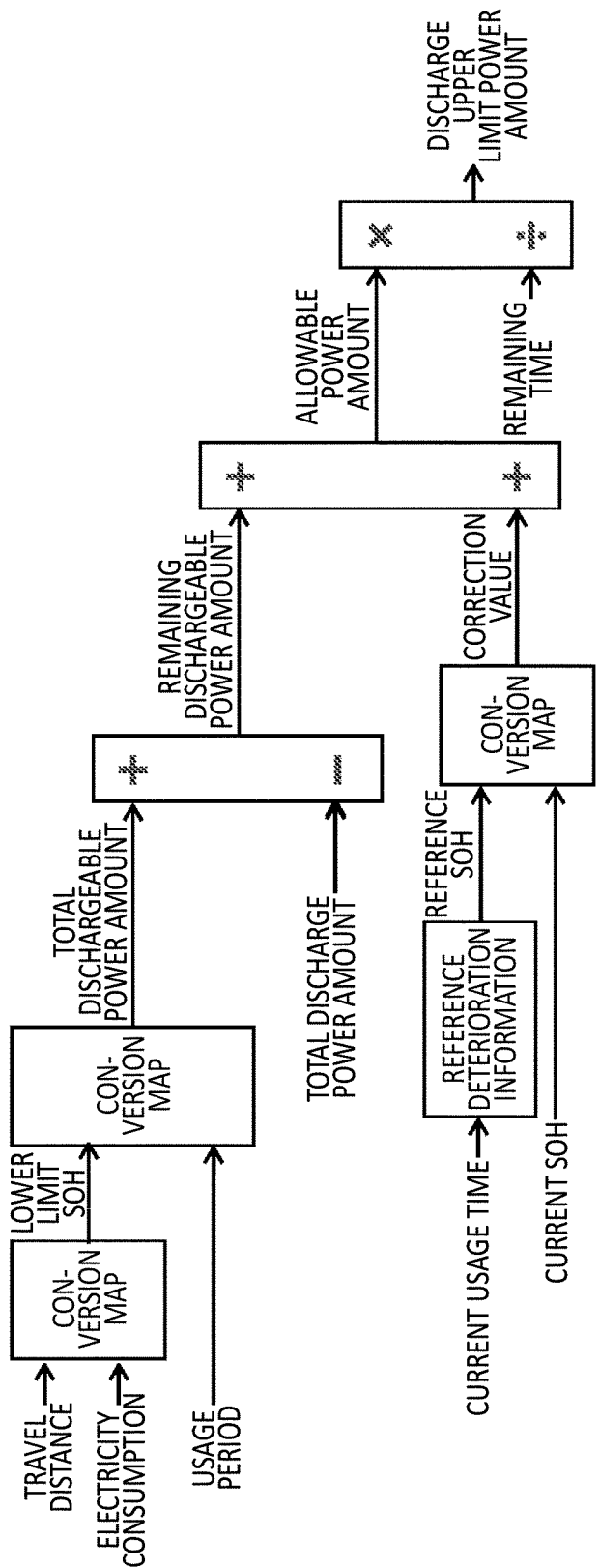
FIG. 11 shows a calculation content of the control apparatus 100 for a case where the remaining dischargeable power amount is corrected based on the current SOH.

FIG. 11 shows a calculation content of the control apparatus 100 for a case where the remaining dischargeable power amount is corrected based on the current SOH. Processing of computing the reference SOH in the processing of FIG. 11 is different from the processing described in connection to FIG. 9, and processing of computing the correction value in the processing of FIG. 11 is different from the processing described in connection to FIG. 9. Other processing is the same as the processing described in connection to FIG. 9. Therefore, description will be omitted except for that of the processing of computing the correction value.

The reference value computation unit 270 computes a reference SOH based on the reference deterioration information and the usage time of the vehicle 10 at a present time. The reference SOH is the value of the SOH on the reference line 600 at a present time. Subsequently, the allowable power amount determination unit 250 computes the correction value by using the reference SOH and the current SOH as well as the conversion map. The conversion map may be the conversion map with the reference SOH and the current SOH as an input and with the correction value as an output. The conversion map may output a greater correction value as the difference between the SOH prediction value and the reference SOH is greater. This correction value corresponds to the correction value computed based on Δ2 described in connection to FIG. 10.

As described above, according to the control of the control apparatus 100, during the period up to the end of the usage period of the vehicle 10, it is possible to provide as much adjusting power as possible from the battery 12 to the power grid 90 while ensuring that the vehicle 10 can travel a distance required by the user.

It has been assumed that, in this embodiment, the control apparatus 100 is provided outside the vehicle 10 and controls the vehicle 10 through the communication network 190. However, a form may be employed where the control apparatus 20 of the vehicle 10 includes at least some functions of the functions included in the control apparatus 100.

The vehicle 10 may be an electric vehicle including an electric car, a hybrid car, and a straddle-type vehicle such as an electric motorcycle. The vehicle 10 is one example of a mobile object. As the mobile object, it may be any mobile object including a battery that moves on land, other than a vehicle. The mobile object may include an aircraft such as an unmanned aerial vehicle (UAV), a vessel, and the like.

Figure 12:
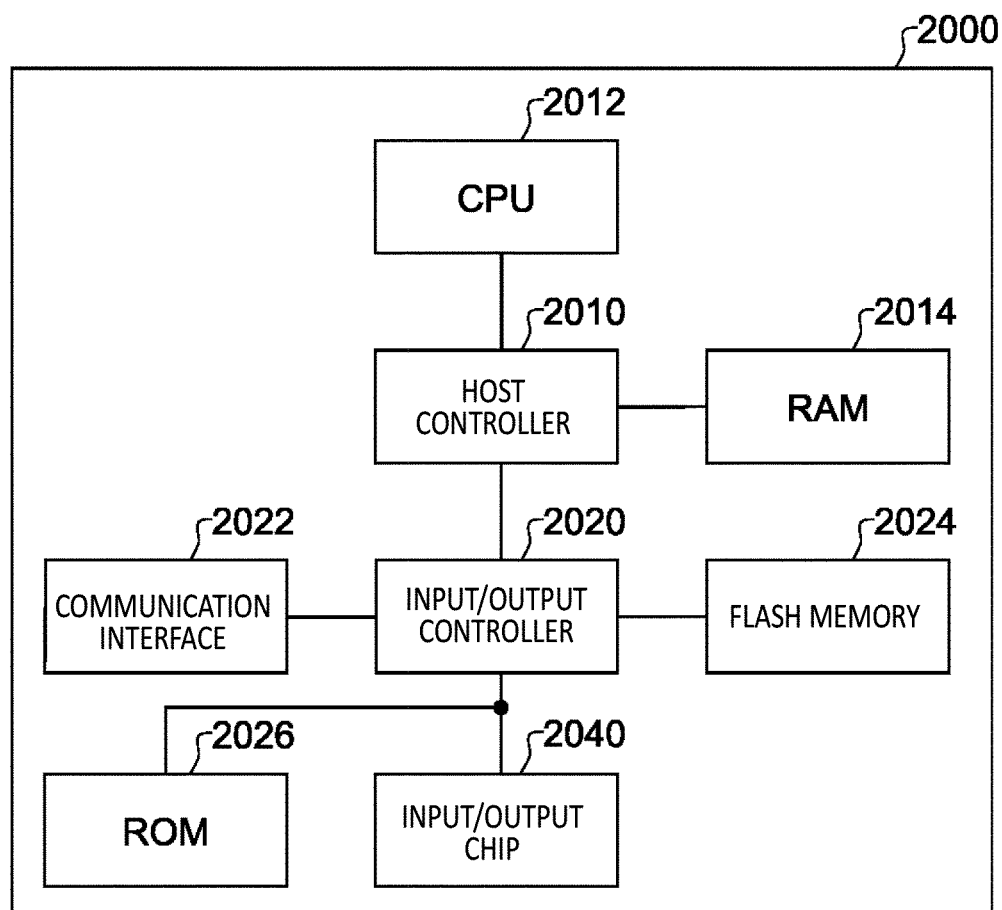
FIG. 12 shows an example of a computer 2000.

FIG. 12 shows an example of a computer 2000 in which a plurality of embodiments of the present invention may be entirely or partly embodied. A program installed on the computer 2000 can cause the computer 2000: to function as a system according to the embodiments or each unit of that system or as an control apparatus 100 or an apparatus such as the control apparatus 100 or each unit of that apparatus; to execute an operation associated with that system or each unit of that system or with that apparatus or each unit of that apparatus; and/or to execute a process according to the embodiments or a stage of that process. Such a program may be executed by a CPU 2012 in order to cause the computer 2000 to execute a certain operation associated with some or all of the blocks in the processing procedure and the block diagram described herein.

The computer 2000 according to this embodiment includes the CPU 2012 and RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to a program stored within the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores a boot program or the like that is executed by the computer 2000 during activation, and/or a program that depends on hardware of the computer 2000. The input/output chip 2040 may also connect various input/output units such as a keyboard, a mouse, and a monitor, to the input/output controller 2020 via an input/output port such as a serial port, a parallel port, a keyboard port, a mouse port, a monitor port, a USB port, an HDMI (registered trademark) port.

The programs are provided via a computer-readable storage medium such as CD-ROM, DVD-ROM, or a memory card, or a network. The RAM 2014, the ROM 2026, or the flash memory 2024 is an example of the computer-readable storage medium. The programs are installed in the flash memory 2024, the RAM 2014, or the ROM 2026, and are executed by the CPU 2012. Information processing written within these programs is read by the computer 2000, resulting in cooperation between the programs and the above various types of hardware resources. An apparatus or a method may be constituted by realizing an operation or processing on information according to a use of the computer 2000.

For example, when communication is executed between the computer 2000 and an external device, the CPU 2012 may execute a communication program loaded in the RAM 2014, and may instruct the communication interface 2022 to perform communication processing based on processing written in the communication program. Under control of the CPU 2012, the communication interface 2022 reads transmission data stored in a transmission buffer processing region provided within a recording medium such as the RAM 2014 and the flash memory 2024, transmits the read transmission data to the network, and writes reception data received from the network into a reception buffer processing region or the like provided on the recording medium.

In addition, the CPU 2012 may cause all or required portions of a file or a database stored in the recording medium such as the flash memory 2024 or the like to be read by the RAM 2014, and may execute various kinds of processing on the data on the RAM 2014. Next, the CPU 2012 writes back the processed data into the recording medium.

Various types of programs and various types of information such as data, a table, and a database may be stored in the recording medium, and may be subjected to information processing. The CPU 2012 may execute, on the data read from the RAM 2014, various kinds of processing including various kinds of operations, information processing, conditional judgment, conditional branching, unconditional branching, information retrieval/replacement, or the like that are described in this specification and specified by instruction sequences of the programs, and writes back a result into the RAM 2014. In addition, the CPU 2012 may retrieve information in a file, a database, or the like within the recording medium. For example, when a plurality of entries are stored within the recording medium, each entry having an attribute value of a first attribute associated with an attribute value of a second attribute, the CPU 2012 may retrieve, from the plurality of entries, an entry whose attribute value of the first attribute is specified and that matches a condition, and may read the attribute value of the second attribute stored within the entry, thereby acquiring the attribute value of the second attribute associated with the first attribute that satisfies a predetermined condition.

The programs described above or a software module may be stored in a computer-readable storage medium on or near the computer 2000. A recording medium such as a hard disk or RAM provided within a server system connected to a dedicated communication network or the Internet can be used as a computer-readable storage medium. The programs stored in the computer-readable storage medium may be provided to the computer 2000 via the network.

The programs installed in the computer 2000 and causing the computer 2000 to function as the control apparatus 100 may instruct the CPU 2012 or the like to cause the computer 2000 to function as each unit of the control apparatus 100. The information processing written in these programs are read by the computer 2000, so that the computer functions as each unit of the control apparatus 100, which is a specific means realized by cooperation between software and the various types of hardware resources described above. Then, these specific means realize calculation or processing of information corresponding to an intended use of the computer 2000 in this embodiment, so that the control apparatus 100 is constructed as a specific control apparatus corresponding to the intended use.

The programs installed in the computer 2000 and causing the computer 2000 to function as the control apparatus 20 may instruct the CPU 2012 or the like to cause the computer 2000 to function as each unit of the control apparatus 20. The information processing written in these programs are read by the computer 2000, so that the computer functions as each unit of the control apparatus 20, which is a specific means realized by cooperation between software and the various types of hardware resources described above. Then, these specific means realize calculation or processing of information corresponding to an intended use of the computer 2000 in this embodiment, so that the control apparatus 20 is constructed as a specific control apparatus corresponding to the intended use.

Various embodiments have been described with reference to the block diagram and the like. In the block diagram, each block may represent (1) a stage of a process in which an operation is executed, or (2) each unit of an apparatus having a role of executing the operation. A certain stage and each unit may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include a reconfigurable hardware circuit including, for example: logical AND, logical OR, exclusive OR (XOR), negative AND (NAND), negative OR (NOR), and other logical operations; and a memory element such as a flip-flop, a register, a field programmable gate array (FPGA), a programmable logic array (PLA), or the like.

The computer-readable storage medium may include any tangible device that can store an instruction executed by an appropriate device, so that the computer-readable storage medium having an instruction stored thereon constitutes at least a part of a product including an instruction that may be executed in order to provide a means to execute an operation specified in the processing procedure or the block diagram. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

The computer-readable instruction may include one of a source code or an object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of other programmable data processing apparatus, locally or via a local area network (LAN), a wide area network (WAN) such as the internet or the like, and the computer-readable instruction may be executed in order to provide a means to execute the operation specified in the described processing procedure or block diagram. Examples of the processor include a computer processor, a processing unit, a microprocessor, a digital signal processor, a controller, a microcontroller, and the like.

While the present invention has been described above using embodiments, a technical scope of the present invention is not limited to a scope described in the above embodiments. It is apparent to persons skilled in the art that varied alteration or improvement can be added to the above embodiments. It is apparent from description of the claims that a form added with such alteration or improvement may also be included in the technical scope of the present invention.

It should be noted that each processing such as the operations, procedures, steps, and stages in the apparatus, system, program, and method shown in the claims, the specification, or the drawings may be realized in any order, unless its execution order is specified as "before", "prior to", or the like and unless output from previous processing is used in subsequent processing. Even if description is made, with respect to an operation flow in the claims, the specification or the drawings, by using "first", "next", or the like as a matter of convenience, it does not necessarily mean that the processing must be performed in this order.

EXPLANATION OF REFERENCES

5: system;
10: vehicle;
12: battery;
20: control apparatus;
30: charging and discharging facility;
42: dwelling unit;
44: establishment;
70: power consumer;
80: power generator;
90: power grid;
100: control apparatus;
180: aggregator server;
190: communication network;
200: processing unit;
210: deterioration state acquisition unit;
220: movement information acquisition unit;
230: deterioration state lower limit value computation unit;
240: restriction unit;
250: allowable power amount determination unit;
260: discharge power amount computation unit;
270: reference value computation unit;
252: deterioration state prediction unit;
280: storage unit;
282: upper limit value storage unit;
290: communication unit;
2000: computer;
2010: host controller;
2012: CPU;
2014: RAM;
2020: input/output controller;
2022: communication interface;
2024: flash memory;
2026: ROM; and
2040: input/output chip.

What is claimed is:
1. A control apparatus comprising:
at least one processor;
a movement information acquisition unit configured to acquire, using the at least one processor, information indicating a usage period of a mobile object and a movement distance of the mobile object to be ensured within the usage period, the usage period being previously set by a user of the mobile object;
a restriction unit configured to restrict, using the at least one processor, a power amount from a battery included in the mobile object to an outside of the mobile object so as to ensure that the mobile object moves the movement distance within the usage period;
a discharge power amount computation unit configured to compute, using the at least one processor, a discharged power amount that has been discharged from the battery during a period from a start of using the mobile object to a present time;
a deterioration state lower limit value computation unit configured to compute, using the at least one processor, based on the movement distance and electricity consumption information of the mobile object, a lower limit SOH that is a lower limit value of state of health (SOH) of the battery that ensures that the mobile object moves the movement distance at an end of the usage period; and
an allowable power amount determination unit configured to compute, using the at least one processor, a remaining dischargeable power amount by subtracting the discharged power amount from a total dischargeable power amount of the battery computed based on the lower limit SOH and the usage period, wherein
the restriction unit is further configured to:
compute, using the at least one processor, by dividing the remaining dischargeable power amount by a remaining time until the end of the usage period, a discharge upper limit power amount that is allowed to be output from the battery to the outside of the mobile object per a predetermined unit period, and
prohibit the battery from being used for power release to the outside of the mobile object when a power amount that has been output from the battery to the outside of the mobile object within the predetermined unit period exceeds the discharge upper limit power amount.

2. The control apparatus according to claim 1, further comprising:
an upper limit value storage unit configured to store, using the at least one processor, an upper limit value of a total discharge power amount that is allowed to be discharged from the battery during a predetermined period from the start of using the mobile object, wherein
the allowable power amount determination unit is further configured to determine, using the at least one processor, the remaining dischargeable power amount based on a power amount obtained by correcting, based on the SOH indicating a deterioration state of the battery at the present time, a difference value obtained by subtracting, from the upper limit value of the total discharge power amount, the discharged power amount computed by the discharge power amount computation unit.

3. The control apparatus according to claim 2, further comprising
a reference value computation unit configured to compute, using the at least one processor, a reference value of the SOH of the battery during the usage period, wherein
the allowable power amount determination unit is further configured to, using the at least one processor, determine the remaining dischargeable power amount based on a result of comparing the SOH of the battery and the reference value.

4. The control apparatus according to claim 2, further comprising
a deterioration state prediction unit configured to compute, using the at least one processor, a prediction value of the SOH of the battery in a future based on a usage history of the mobile object, wherein
the allowable power amount determination unit is further configured to determine, using the at least one processor, the remaining dischargeable power amount based on a result of comparing the prediction value of the SOH at the end of the usage period and the lower limit value of the SOH.

5. The control apparatus according to claim 4, wherein
the allowable power amount determination unit is further configured to increase, using the at least one processor, the remaining dischargeable power amount when the prediction value of the SOH is greater than the lower limit SOH.

6. The control apparatus according to claim 5, wherein
the allowable power amount determination unit is further configured to decrease, using the at least one processor, the remaining dischargeable power amount when the prediction value of the SOH is smaller than the lower limit SOH.

7. The control apparatus according to claim 4, wherein
the allowable power amount determination unit is further configured to decrease, using the at least one processor, the remaining dischargeable power amount when the prediction value of the SOH is smaller than the lower limit SOH.

8. The control apparatus according to claim 1, further comprising
a reference value computation unit configured to compute, using the at least one processor, a reference value of the SOH indicating a deterioration state of the battery during the usage period, wherein
the allowable power amount determination unit is further configured to determine, using the at least one processor, the remaining dischargeable power amount based on a result of comparing the SOH of the battery and the reference value.

9. The control apparatus according to claim 1, further comprising
a deterioration state prediction unit configured to compute, using the at least one processor, a prediction value of the SOH indicating a deterioration state of the battery in a future based on a usage history of the mobile object, wherein
the allowable power amount determination unit is further configured to determine, using the at least one processor, the remaining dischargeable power amount based on a result of comparing the prediction value of the SOH at the end of the usage period and the lower limit SOH.

10. The control apparatus according to claim 9, wherein
the allowable power amount determination unit is further configured to increase, using the at least one processor, the remaining dischargeable power amount when the prediction value of the SOH is greater than the lower limit SOH.

11. The control apparatus according to claim 10, wherein
the allowable power amount determination unit is further configured to decrease, using the at least one processor, the remaining dischargeable power amount when the prediction value of the SOH is smaller than the lower limit SOH.

12. The control apparatus according to claim 9, wherein the allowable power amount determination unit is further configured to decrease, using the at least one processor, the remaining dischargeable power amount when the prediction value of the SOH is smaller than the lower limit SOH.

13. The control apparatus according to claim 1, wherein the mobile object is a vehicle.

14. A mobile object comprising the control apparatus according to claim 1.

15. The control apparatus according to claim 1, further comprising:
a deterioration state prediction unit configured to compute, using the at least one processor, a predicted SOH value at the end of the usage period that is predicted from the SOH of the battery at the present time; and
a reference value computation unit configured to compute, using the at least one processor, a reference SOH to be a reference value of the SOH of the battery at the end of the usage period based on an elapsed usage time of the mobile object at the end of the usage period and predetermined reference deterioration information that converts the elapsed usage time of the mobile object into the reference value of the SOH of the mobile object.

16. The control apparatus according to claim 15, wherein the allowable power amount determination unit is further configured to:
compute a correction value using the reference SOH, the predicted SOH, and a predetermined conversion map that converts the reference SOH and the predicted SOH into the correction value for the remaining dischargeable power amount, and
correct the remaining dischargeable power amount by adding the correction value to the remaining dischargeable power amount.

17. A method comprising:
acquiring information indicating a usage period of a mobile object and a movement distance of the mobile object to be ensured within the usage period, the usage period being previously set by a user of the mobile object;
restricting a power amount from a battery included in the mobile object to an outside of the mobile object so as to ensure that the mobile object moves the movement distance within the usage period;
computing a discharged power amount that has been discharged from the battery during a period from a start of using the mobile object to a present time;
computing, based on the movement distance and electricity consumption information of the mobile object, a lower limit SOH that is a lower limit value of state of health (SOH) of the battery that ensures that the mobile object moves the movement distance at an end of the usage period; and
computing a remaining dischargeable power amount by subtracting the discharged power amount from a total dischargeable power amount of the battery computed based on the lower limit SOH and the usage period, wherein
the restricting includes:
computing, by dividing the remaining dischargeable power amount by a remaining time until the end of the usage period, a discharge upper limit power amount that is allowed to be output from the battery to the outside of the mobile object per a predetermined unit period, and
prohibiting the battery from being used for power release to the outside of the mobile object when a power amount that has been output from the battery to the outside of the mobile object within the predetermined unit period exceeds the discharge upper limit power amount.

18. A non-transitory computer-readable storage medium having stored thereon a program that causes a computer to perform:
acquiring information indicating a usage period of a mobile object and a movement distance of the mobile object to be ensured within the usage period, the usage period being previously set by a user of the mobile object;
restricting a power amount from a battery included in the mobile object to an outside of the mobile object so as to ensure that the mobile object moves the movement distance within the usage period;
computing a discharged power amount that has been discharged from the battery during a period from a start of using the mobile object to a present time;
computing, based on the movement distance and electricity consumption information of the mobile object, a lower limit SOH that is a lower limit value of state of health (SOH) of the battery that ensures that the mobile object moves the movement distance at an end of the usage period; and
computing a remaining dischargeable power amount by subtracting the discharged power amount from a total dischargeable power amount of the battery computed based on the lower limit SOH and the usage period, wherein
the restricting includes:
computing, by dividing the remaining dischargeable power amount by a remaining time until the end of the usage period, a discharge upper limit power amount that is allowed to be output from the battery to the outside of the mobile object per a predetermined unit period, and
prohibiting the battery from being used for power release to the outside of the mobile object when a power amount that has been output from the battery to the outside of the mobile object within the predetermined unit period exceeds the discharge upper limit power amount.

* * * * *